June 8, 1965 L. MONACHESI 3,188,568
ARRANGEMENT FOR TUNING OF THE TRANSMITTING ANTENNA
OF A DATA TRANSMISSION SYSTEM
Filed Nov. 23, 1962 3 Sheets-Sheet 1

INVENTOR
LUIGI MONACHESI
BY C. A. Gulbrandsen
ATTORNEY

June 8, 1965 L. MONACHESI 3,188,568

ARRANGEMENT FOR TUNING OF THE TRANSMITTING ANTENNA OF A DATA TRANSMISSION SYSTEM

Filed Nov. 23, 1962 3 Sheets-Sheet 2

INVENTOR
LUIGI MONACHESI

BY C. A. Gulbrandsen

ATTORNEY

INVENTOR
LUIGI MONACHESI

BY C. A. Gulbrandsen
ATTORNEY

United States Patent Office 3,188,568

Patented June 8, 1965

3,188,568

ARRANGEMENT FOR TUNING OF THE TRANSMITTING ANTENNA OF A DATA TRANSMISSION SYSTEM

Luigi Monachesi, Milan, Italy, assignor to Marelli Lenkurt S.p.A., Milan, Italy

Filed Nov. 23, 1962, Ser. No. 239,543
Claims priority, application Italy, Dec. 5, 1961, 21,866/61; Sept. 15, 1962, 18,174/62
2 Claims. (Cl. 325—173)

The present invention relates to an electronic servomechanism device for the automatic and quick tuning of antennae having a high Q factor, and being part of of transmitting stations for low or very low frequencies, keyed by the frequency shift method and producing modulated waves of the $F_1$ and $F_4$ types.

The traffic capacity of low frequency and very low frequency (L.F. and V.L.F.) radio transmitters, as presently used is limited by the remarkable power, of the order of hundreths of times of the radiofrequency feed, stored by the antenna system. As the transmission of an intelligible signal (Morse or teletype or facsimile) consists in changing (or "modulating") one of the parameters of the radiowave, this implies certain reactions in the electric values of the circuits, having a great importance due to the involved power, whereby it is necessary to limit the quickness of the signal sequence and therefore of the traffic.

Various systems or circuits have been suggested in order to substantially increase the traffic capacity of the radio transmitters for low and very low frequencies wherein the intelligence will be transmitted by the frequency modulation system.

A summary of the prior art is contained in volume 3, CS–5, issue December 1957 of IRE Transactions on Communications Systems by H. C. Wolff of U.S. Navy Electronics Laboratories.

In the circuits described in said publication, the antenna is tuned by a heteroparametric element, and an electronic device controls simultaneously the frequency shift of the heteroparametric element and that of the radiofrequencies generator energizing the antenna. A heteroparametric element is one which operates from one state to another in an essentially linear manner, and whose parameters may be varied by an external control mechanism.

This unit by its own nature is very imperfect as the two frequency shifts are independent from one another although produced by a single control.

The device according to this invention applies a different principle according to which the heteroparametric circuit automatically corrects its tuning when the radiofrequency generator feeding the antenna is modulated by the frequency shift system. It can be applied to telegraphic transmissions of $F_1$ type in Morse Code or in other code (for instance in the code of the teletypes) and for the facsimile transmissions of the $F_4$ type or other transmissions requiring similar signals.

The servomechanism device according to this invention is characterized in that it comprises a first element detecting the tuning error of the antenna circuit, and producing a variable electric signal (error signal); and a second element being part of the tuning circuit of the antenna, the inductance of which is caused to vary by the suitably amplified variable electric signal, so as to correct the tuning error. This tuning error is detected by a phase discriminator which compares the output voltage phase of the power amplifier energizing the antenna with the phase of the input voltage energizing said amplifier, thus producing an error signal.

Further features and details will be hereinafter illustrated and described only by way of example, with reference to the attached drawings wherein.

Figure 1:
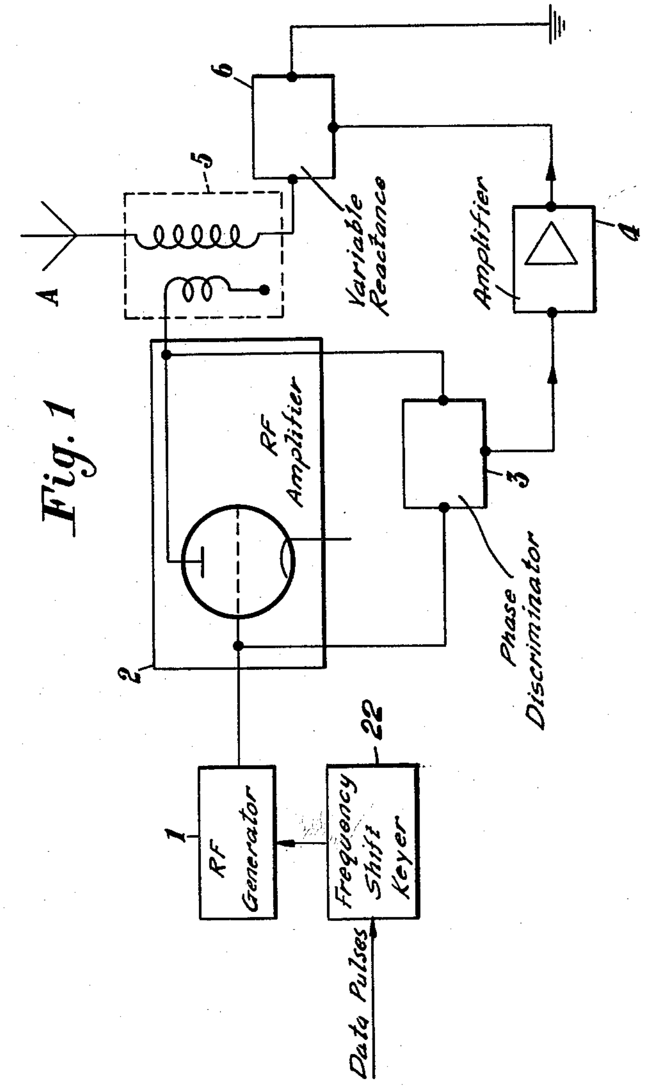
FIG. 1 shows the block diagram of the automatic tuning system according to this invention.

With reference to FIG. 1, by 1 has been denoted the radiofrequency generator producing a very low frequency wave (f.i. 20,000 c./sec.) or low frequency wave for radiotelegraphic transmissions keyed by the frequency shift method; 22 is a frequency shift keyer of the well-known type which receives intelligence in the form of data pulses, and correspondingly shifts the frequency of generator 1; 2 is a (tube or transistor) amplifier of the wave generated by 1, supplying the power to the antenna A; 3 is a phase discriminator taking up the input and output radiofrequency voltage of the amplifier 2, comparing suitably the phases of said voltages to detect the phase error which is an univocal function of the tuning error of the amplifier; 4 is an amplifier of the tuning error signal detected by the phase discriminator, and 5–6 is the inductor (or tuner) of the antenna with an energizing coupling to the amplifier 2. This tuner is equivalent to an inductance the value of which can be caused to change by an electric signal having a suitable amplitude coming from the amplifier 4. The part denoted by 5 is a common inductance with coupling, while the part denoted by 6 is the heteroparametric section of said inductor which can be caused to vary by the electric signal coming from the amplifier 4.

The typical operation of the device is as follows:

Starting from a tuned condition of the amplifier 2 and of the antenna A, when the frequency of the generator is shifted there is developed a difference in phase between the radiofrequency input and output voltage of the amplifier. The discriminator detects an error signal which suitably amplified by the amplifier 4 controls the heteroparametric circuit 6 which in turn tends to establish again the tuned conditions disturbed by the frequency shift.

In order to better understand the operation of the device, reference is to be made to two embodiments.

Figure 2:
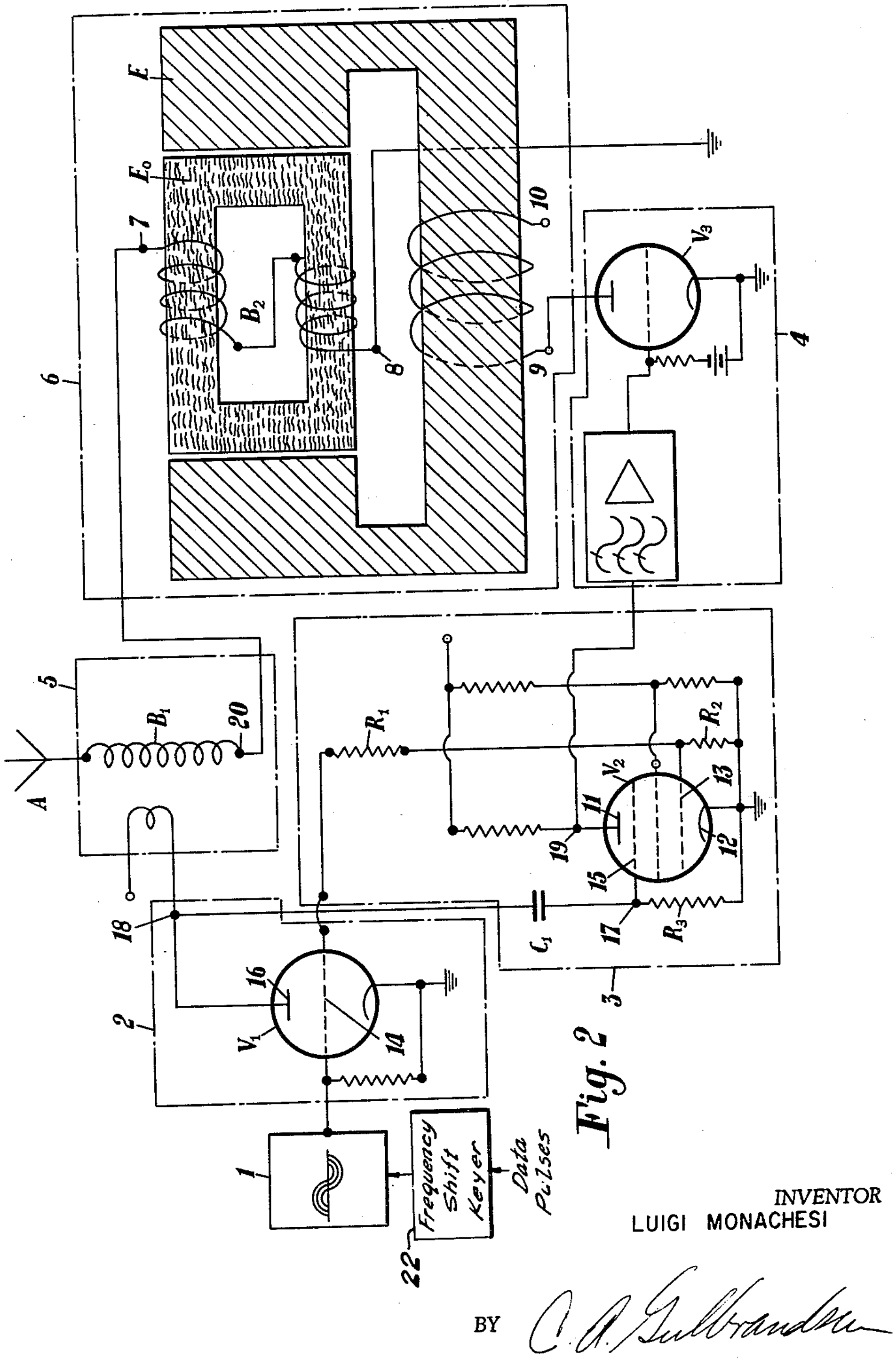
FIG. 2 shows the basic diagram of one embodiment of the device of FIG. 1.

In the first embodiment shownin FIG. 2 are denoted by the same reference characters the corresponding parts of FIG. 1.

The radiofrequency generator 1, having any power, is keyed by the code signals to be transmitted by the frequency shift method.

In a code signal, let $f_0$ and $f_1$ be the two signalling frequencies, where $f_1>f_0$, $\Delta f=f_1-f_0$, $\Delta f<<<f_0$.

The amplifier 2 consists of the tube $V_1$ which is the last amplifying stage of the generator 1 and which consist of one or more parallel or push pull tubes according to the power of the transmitter.

The inductor 5–6 necessary to tune the antenna comprises two coils, one of which $B_1$ is air wound, while the other $B_2$ is wound on a ferrite core $E_0$.

The inductance $L_1$ of $B_1$ is far greater than the inductance $L_2$ of $B_2$.

The inductance $L_2$ depends, besides upon the winding leading to the points 7 and 8, upon the differential permeability of the ferrite core. The differential permeability in turn depends upon the magnetic flux which is induced in the ferrite core by the electro-magnet E which is energized by the "tuning" winding leading to the terminals 9 and 10.

The phase discriminator 3 essentially consists of a three grid discriminating tube $V_2$ with anode 11, cathode 12 and other secondary electrodes not shown in the figure as unnecessary to the present disclosure purposes. A typical example of a tube suitable to the operation of this circuit is the 6BN6 tube.

The grid 13 is the signal grid and is connected to the grid 14 of the final tube $V_1$ of the generator 1, through a voltage divider consisting of the resistor $R_1$–$R_2$. Due to this connection the signal grid 13 receives a radiofrequency voltage which is in phase with that of the control grid 14 of the tube $V_1$. The grid 15 of the tube $V_2$ receives the voltage from the anode 16 of the final tube $V_1$ through the voltage divider formed by the resistor $R_3$ and the capacitor $C_1$.

The resistance of the resistor $R_3$ is very small with respect to the reactance of the capacitor $C_1$ at the frequency $f_0$ i.e.

$$R_3 <<< \frac{1}{2\pi f_0 C_1}$$

and therefore the radiofrequency voltage that the quadrature grid 15 receives from the resistor $R_3$ at the point 17 where it is connected to the capacitor $C_1$, is out of phase by 90° with respect to the radiofrequency voltage of the terminal 18 connected to the anode 16 of $V_1$.

As $\Delta f <<< f_0$ this 90° out-of-phase will subsist also for $f_0+\Delta f$ and for all the intermediate values between $f_0$ and $f_1$.

Concluding, the discriminating tube $V_2$ receives from the tube $V_1$ the radiofrequency voltage as follows:

Onto the signal grid 13 a voltage in phase with the voltage of the grid 14 of the valve $V_1$; onto the grid 15 a voltage which is in quadrature with respect to the anode voltage of the valve $V_1$.

If, as reference phase or zero phase, is taken the phase of the voltage applied to the grid 13 of the tube $V_2$, there results that:

(1) The phase angle of the voltage at the point 17 (with respect to the voltage of 13) does not depend upon the frequency of the generator 1;

(2) The phase angle in 17 (with respect to 13) is 90° if the antenna system (inclusive of the tuning device $B_1$–$B_2$ and the coupling) is tuned with the frequency of the generator 1;

(3) Said phase angle is lower than 90° if the impedance of said system is inductive, higher than 90° if said system is capacitive as it occurs when the system is tuned on a frequency lower or higher than that of the energizing signal.

The amplifier 4 is a tuning filter amplifier suitable to respond to a wide band of frequencies (in the order of thousandths of cycles/sec.) starting from the zero frequency.

The term "filter amplifier" denotes that the frequency and phase response of the amplifier must be suitably adjusted in order to obtain the best effects.

The amplifier ends by a tube $V_3$ which will be termed "tuning tube" the anodic current of which energizes the winding lead to the terminals 9–10 of the electro-magnet E controlling the base flux of the ferrite core $E_0$ of the inductor $B_2$. Having thus described and illustrated the essential elements of the circuit, the operation thereof is as follows:

Be it assumed that the transmitter is pre-disposed for broadcasting the frequency $f_0$ and for shifting to the frequency $f_1$ due to the frequency shift $F_1$ or $F_4$ signalling. For the frequency $f_0$ the antenna will be tuned and therefore the radiofrequency voltage of the grid 14 of the valve $V_1$ will be in phase opposition with respect to the voltage at the anode 16 of the same tube.

As aforesaid the radiofrequency voltage of the grids of the discriminating tube $V_2$ denoted by 13 and 15 will be in phase quadrature. To this state corresponds an anode current of the tube $V_2$ which will be termed "normal" or "tuned." At the terminal 19 therefore a normal or tuned voltage will be obtained. The terms "normal" and "tuned" mean that by application of this value of voltage to the amplifier 4, the final tube $V_3$ of said amplifier delivers an anode current which, through the winding leading to the terminals 9–10, determines a base flux in the electro-magnet E corresponding to the value of the inductance of $B_2$ corresponding to the tuned conditions of the antenna.

If now the frequency of the generator is caused to change from $f_0$ to $f_1$ by $F_1$ or $F_4$ modulation as accomplished by frequency shift keyer 22, the antenna will be no more tuned and the radiofrequency voltages at the grid and the anode of the tube $V_1$ will no more be in exact phase opposition. Due to the connections between the tubes $V_1$ and $V_2$ the voltage at the grids 13–15 will no more be in phase quadrature and the anode current of the tube $V_2$ will be different from the tuned current.

This means that the frequency shift of the generator from $f_0$ to $f_1$ determines an error signal which coming from the tube $V_2$ is amplified by the amplifier 4 and modifies the base flux of the electromagnet E with the consequence of changing the inductance of the inductor $B_2$ i.e. the tuning inductance of the antenna.

The sign of this variation depends, at parity of other conditions, from the connections 9–10 between the tube $V_3$ and the saturating winding of the electromagnet E. One of the two possible connections will therefore produce a variation of inductance tending to tune the antenna for the frequency $f_1$. When the generator 1 comes again to the frequency $f_0$ the tuned current will be established again in the phase discriminator 3 and the antenna will be tuned again on the frequency $f_0$. This correction process represents a phase negative feedback system.

In the involved case it is capable of modifying continuously and exactly the constants of the heteroparametric circuit as described and of embodying a system for the $F_1$ frequency shift telegraphy improved with respect to the prior art.

The operation speed, i.e. the keying speed and therefore the traffic capacity of a VLF or LF transmitter provided with these circuits, can be largely increased with respect to that obtained by the same antenna without the described circuit or even provided with heteroparametric circuits as known in the prior art.

In FIG. 2 the inductance of $B_2$ is in series with the inductance of $B_1$; this has an only exemplary purpose as the same result can be obtained by locating $B_2$ in parallel with one part of $B_1$ and causing still the inductance of $B_2$ to change by the change of the magnetic saturation flux of the electromagnet E.

Figure 3:
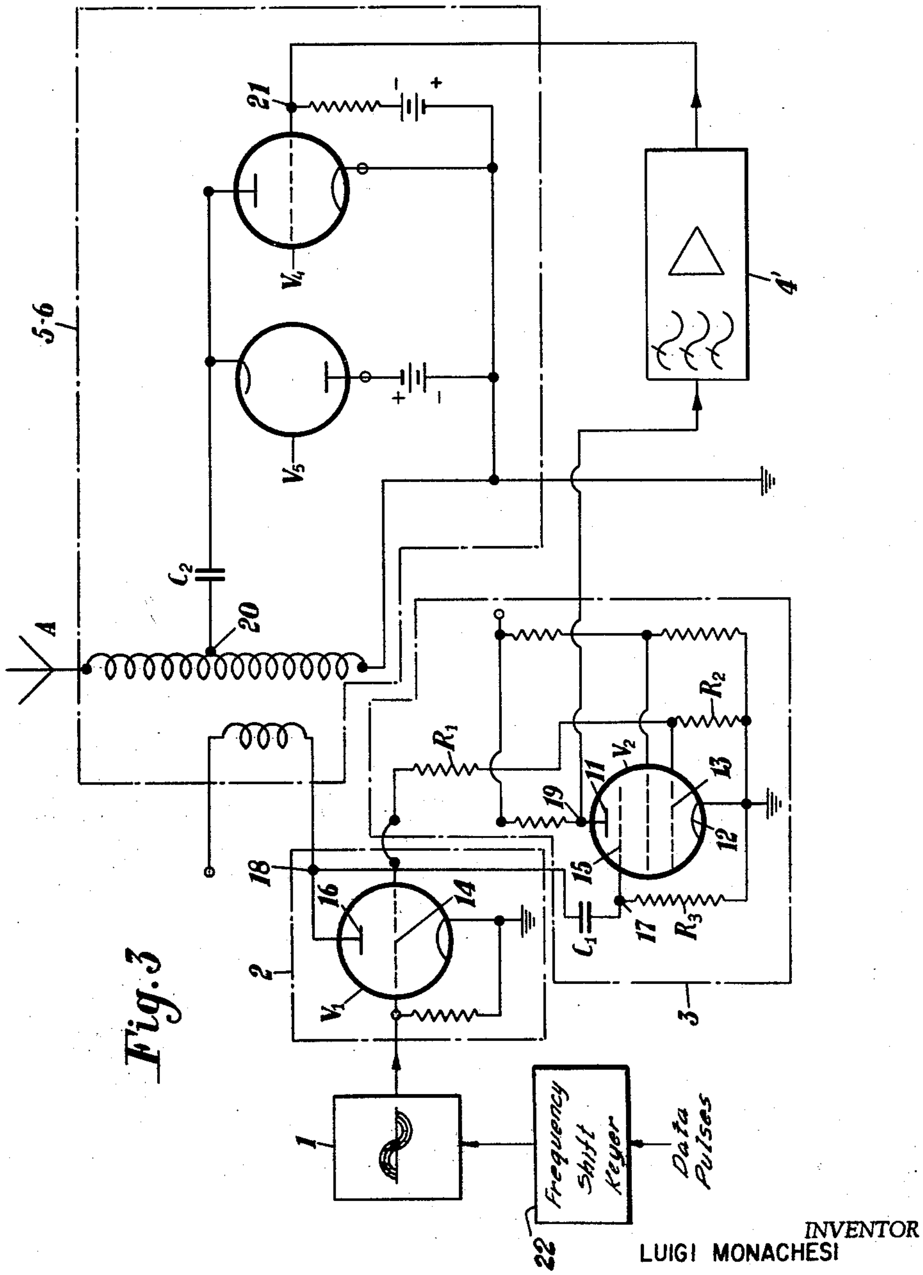
FIG. 3 shows another embodiment of the device of FIG. 1.

In the second embodiment shown in FIG. 3 the device of FIG. 1 has been embodied with certain means different from those used in the circuit of FIG. 2. The equal parts of either circuit have been denoted by the same reference characters. The difference of the circuit of FIG. 2 is that in the circuit of FIG. 3 the heteroparametric element, instead of being an inductance with a ferritic core saturable by an electromagnet, consists of an inductor from part of which is shunted a current through a capacitor $C_2$ and the electronic tubes $V_4$–$V_5$.

The capacitor $C_2$ is shunted from the point 20 of the antenna inductor and is connected to the electronic tubes $V_4$–$V_5$ which operate, with respect to the capacitor, as an electronic switch. The control point of the electronic switch is the point 21 where acts the signal of tuning error produced by the phase discriminator 3 and amplified by the amplifier 4′.

Under these conditions, when the antenna circuit is tuned on the frequencies $f_0$ and the generator 1 moves from $f_0$ to $f_1$ for the frequency shift due to the telegraphic transmission of the $F_1$ or $F_4$ types, in the phase discriminator 3 a tuning error signal will be produced, and said error is amplified by the amplifier 4′ and which operates at the point 21 shunting a radiofrequency current from the point 20 of the antenna inductor through the capacitor $C_2$ and correcting the out-of-tuning state of the antenna for the frequency $f_1$. The operation is thus equal to that of the circuit of FIG. 2 and comes within that of the principal diagram of FIG. 1.

Other circuits are possible by changing the heteroparametric element denoted by 6 in FIG. 1 and shunting from the point 20 in FIGS. 2 and 3, without escaping from the operation principle forming the subject matter of this invention.

In order to render easy the embodiment of this invention, certain indications have been hereinafter disclosed suitable to select the final tube $V_3$ of the tuning filter amplifier 4 of FIG. 2, and the tubes $V_4$, $V_5$ of FIG. 3.

In the embodiment of FIG. 2, where the heteroparametric element is a saturable reactor, the tube $V_3$ is part of the circuit of the electromagnet E producing the saturation of the permeability core $E_0$. Therefore, the anodic resistance of the tube is in series with the winding of the electro-magnet, leading to the terminals 9 and 10. This circuit has an inductance and a resistance the ratio of which L/R is, as it is known, the time constant of the electro-magnet.

In the embodiment of the tuning device it is suitable to obtain low values of the time constant and therefore, with other conditions being equal, this requires a minimum value of L and a maximum value of R.

For the saturation of the core $E_0$ a certain magnetic flux is necessary and this, as it is known, is proportional to the product NI of the number of the turns N of the winding leading to the terminals 9–10, by the anodic current I of the tube $V_3$.

The inductance L of the winding is, in turn, proportional to the square of the number of the turns N of the winding. Under the circumstances, which are well-known to the skilled persons, there derives that in order to obtain the lowest time constant L/R for a determined product NI it will be suitable to increase I decreasing N and to use a tube able to deliver that current with the maximum possible anodic resistance.

Without affecting the fundamental function of the three electrodes cathode-control grid-anode, which are the sole elements making part of the diagrammatic circuit of the tube $V_3$, tubes having other auxiliary electrodes (screen grids, accelerator grids, electronic directors, electronic lenses and the like) can facilitate and enlarge the field of selection of the tube $V_3$ as these auxiliary electrodes allow generally the anodic resistance to be increased without decreased anodic current. Finally, in case that the potentiality of one single tube is not sufficient, it will be possible to arrange two or more tubes in parallel without modifying the principles of the art whereon the present invention is grounded.

In the case of the embodiment shown in FIG. 3, wherein the heteroparametric element of the antenna inductance is an inductor wherefrom is shunted a capacitor $C_2$ controlled by the tube $V_4$ and by the diode $V_5$, the time constant of the circuit is given by the product of the capacity of $C_2$ by the anodic resistance of the tube $V_4$.

For equal values of $C_2$, in order to have the minimum time constant, it is required to use tubes and diodes having the minimum anodic resistance or to arrange a certain number of said elements in parallel.

I claim:

1. Arrangement for the tuning of the transmitting antenna of a data transmission system using frequency shift keying for transmitting the intelligence represented by the data pulses, said arrangement comprising:
   - an RF signal generator;
   - frequency shift keying means for frequency modulating said signal generator in response to said data pulses so that said resulting frequency modulation represents said intelligence;
   - a high Q resonant antenna circuit tuned to a first frequency;
   - an RF power amplifier having an input terminal and an output terminal, said amplifier coupling said keyed signal generator to said antenna circuit;
   - a phase discriminator with two input terminals, one of said discriminator input terminals coupled to said amplifier input terminal, the other of said discriminator input terminals coupled to said amplifier output terminal, said phase discriminator detecting a keyed signal generator frequency shift from said first frequency to a second frequency and producing a corresponding tuning error signal;
   - a wide band, fast response amplifier coupled to the output of said phase discriminator, to amplify said tuning error signal;
   - and variable reactance means comprising the combination of a capacitor in series with an electronic switch, said combination connected in parallel with a portion of said tuned antenna circuit, to vary the resonance of said tuned antenna circuit from said first frequency to said second frequency in direct response to said amplified tuning error signal.

2. An arrangement as claimed in claim 1, wherein said electronic switch includes a diode connected in parallel with an electron tube, said electronic switch impedance varying from a very high impedance to a very low impedance in response to said amplified tuning error signal.

References Cited by the Examiner

UNITED STATES PATENTS

| | | | |
|---|---|---|---|
| 1,395,987 | 11/21 | Round | 325—174 |
| 1,684,235 | 9/28 | Love | 325—173 |
| 1,907,965 | 5/33 | Hansell | 325—174 |
| 1,931,864 | 10/33 | Gerth et al. | 325—173 |
| 2,376,667 | 5/45 | Cunningham et al. | 325—174 |
| 2,502,396 | 3/50 | Vogel | 325—174 |
| 2,538,539 | 1/51 | Stokes | 325—177 |
| 2,712,061 | 6/55 | McClellan | 325—173 |
| 2,883,524 | 4/59 | Deise et al. | 325—173 |

DAVID G. REDINBAUGH, *Primary Examiner.*